United States Patent [19]

Lasater

[11] Patent Number: 5,667,826

[45] Date of Patent: Sep. 16, 1997

[54] METHOD FOR FORMING FLOWERS FROM A CONFECTIONERY MATERIAL

[76] Inventor: Judy Lasater, Rte. 1, Box 59L, Erwin, N.C. 28339

[21] Appl. No.: 643,188

[22] Filed: May 6, 1996

[51] Int. Cl.$^6$ ............................... A23P 1/10; B29C 41/02
[52] U.S. Cl. ................ 426/104; 264/153; 264/219; 264/291; 264/330; 426/512; 426/518; 426/658
[58] Field of Search .................. 426/104, 512, 426/518, 658; 264/153, 219, 291, 330

[56] References Cited

U.S. PATENT DOCUMENTS

| | | | |
|---|---|---|---|
| 1,526,112 | 2/1925 | Blackaller et al. | 425/376.1 |
| 3,420,210 | 1/1969 | Lindquist | 118/18 |
| 3,790,331 | 2/1974 | Backer | 425/464 |
| 3,850,563 | 11/1974 | Milonas et al. | 425/275 |
| 4,384,838 | 5/1983 | Laughlin | 425/299 |
| 5,144,880 | 9/1992 | Schmit | 99/342 |
| 5,437,829 | 8/1995 | Rist | 264/153 |

*Primary Examiner*—Leo B. Tentoni
*Attorney, Agent, or Firm*—Rhodes, Coats & Bennett, L.L.P.

[57] ABSTRACT

A method and apparatus for forming simulated flowers from cut-out sheets of a confectionery material such as gum paste. A kit for forming the simulated flowers includes one or more template cutters formed in the shapes of the leaves and/or petals of an actual flower, a male mold having an exterior surface cast from the interior of the actual flower, and a flower holder having a surface that generally conforms to the exterior or interior of the flower. The flower holder preferably comprises either a female or male mold or a deformable material having indentations therein. Optional components of the kit include a stamen mold for forming a simulated stamen and a ruffling tool for ruffling the peripheral edges of the simulated flower. The method generally includes constructing the male mold from the actual flower, constructing the flower holder, rolling the gum paste into a thin sheet, cutting the sheet to form blanks in the shape of leaves and/or petals with the template cutters, forming the blanks on the exterior surface of the male mold, and supporting the simulated flower thus formed in the flower holder to maintain its molded shape until the confectionery material hardens. If desired, the edges of the cut-out sheets may be ruffled and the simulated stamen may be molded and inserted into the interior of the simulated flower.

15 Claims, 5 Drawing Sheets

METHOD FOR FORMING FLOWERS FROM A CONFECTIONERY MATERIAL

FIELD OF THE INVENTION

The present invention generally relates to the formation of cake decorations from a confectionery material and more particularly relates to a method and apparatus for molding sheets of icing or gum paste into simulated flowers.

BACKGROUND OF THE INVENTION

Various techniques have been used in the past by bakers to form flowers and other decorations on cakes, cookies, pies, etc. For example, cake decorators typically form simulated flowers from edible materials such as gum paste, icing, or chocolate, which are then placed on a cake. Simulated flowers can be made by extruding icing through a specially shaped nozzle that produces leaf and petal-like formations of icing. Two patents that illustrate various icing extrusion techniques include U.S. Pat. No. 3,790,331 to Backer and U.S. Pat. No. 1,526,112 to Blackaller et al.

Another technique for forming flowers from icing is shown in U.S. Pat. No. 3,420,210 to Lindquist, whereby icing is deposited on top of a rotating turntable and shaped into a flower. U.S. Pat. No. 4,384,838 to Laughlin discloses a device used to press designs such as flowers into the top of an uncooked, rolled-out pie crust. U.S. Pat. No. 3,850,563 to Milonas et al. discloses a method for molding flowers by dipping a chilled mold into molten chocolate or icing. The molding surface of the mold has the shape of the interior of a flower. When the mold is dipped into the molten confectionery material, the material cools on the mold and forms a simulated flower.

While the devices and methods disclosed in the aforementioned patents all have their advantages, none of them discloses a way to accurately reproduce flowers from a confectionery material that are indistinguishable from real flowers. For example, none of these patents provides means for varying the thickness of the simulated leaves or petals or means for reproducing the internal features of a flower such as the stamen. Therefore, a need exists in the cake decorating arts for an apparatus and method that can be used to form simulated flowers from a confectionery material that are nearly identical to actual flowers.

SUMMARY OF THE INVENTION

In view of the above, the present invention entails both a method and an apparatus that are used to accurately reproduce flowers by forming cut-out sheets of a confectionery material around a mold cast from an actual flower. In the preferred embodiment of the invention, the apparatus includes a kit for forming simulated flowers that includes at least one template cutter formed in the shape of a part of a flower model and a male mold having an exterior surface that conforms to an interior surface of the flower model. A flower holder having a surface that generally conforms to an exterior surface of the simulated flower may also be provided.

Each template cutter is used to cut a thin sheet of confectionery material such as gum paste to form a blank that corresponds to the shape of a petal or leaf. The blanks are pressed onto the exterior surface of the male mold, which forms the blank and applies texture to the surface of the blanks to create the simulated flower. The flower holder is used to support the simulated flower after molding to maintain its shape until the confectionery material hardens.

In one embodiment, the flower holder comprises a female or male mold having an interior surface that generally conforms to the exterior surface of the simulated flower. In another embodiment, the flower holder comprises a deformable granular material.

In addition, the kit of the present invention may optionally include a stamen mold having a concave molding surface conforming to an exterior surface of a stamen model and/or a ruffling tool for ruffling the peripheral edges of the blanks of confectionery material. The stamen mold molds confectionery material disposed around an elongated member into the shape of the stamen model. The simulated stamen thus formed may then be inserted into the interior of the simulated flower. The ruffling tool is used to thin the edges of the blanks, thereby stretching the confectionery material and increasing the surface area of the blanks along their edges to simulate ruffled edges found on particular flower models.

The method of forming simulated flowers from a confectionery material according to the present invention generally includes the following steps: (a) constructing a male mold having an exterior surface that conforms to an interior surface of a flower model; (b) constructing a flower holder having a surface that generally conforms to the exterior or interior of the flower model; (c) rolling a confectionery material such as gum paste into a thin sheet; (d) cutting the sheet of confectionery material into one or more blanks with template cutters that correspond to the shapes of petals and/or leaves; (e) wrapping the confectionery material blanks around the male mold and pressing them onto its exterior surface, thereby creating a simulated flower; and (f) removing the simulated flower from the male mold and supporting it in the flower holder to maintain the flower's molded shape until the confectionery material hardens.

If desired, the peripheral edges of the blanks may be ruffled, preferably prior to wrapping the them around the male mold. Thinning the edges stretches the confectionery material and increases the surface area of the blanks along the edges to simulate ruffled edges of particular flower models. In addition, the following optional steps may be performed to provide a simulated stamen for the simulated flower: (a) disposing confectionery material around an elongated member such as a wire; (b) inserting the confectionery material into a stamen mold having a concave molding surface conforming to an exterior surface of a stamen model; and (c) inserting the simulated stamen thus formed into the interior of the simulated flower. Also included in the kit will be a picture of the real flower to be reproduced.

Simulated flowers formed using the apparatus and method of the present invention have a much more realistic appearance than conventionally formed confectionery flowers. As such, the present invention represents a marked advance in the cake decorating arts.

Other aspects and advantages of the present invention will become apparent and obvious from a study of the following description and the accompanying drawings, which are merely illustrative of the invention.

DETAILED DESCRIPTION OF THE INVENTION

Figure 1:
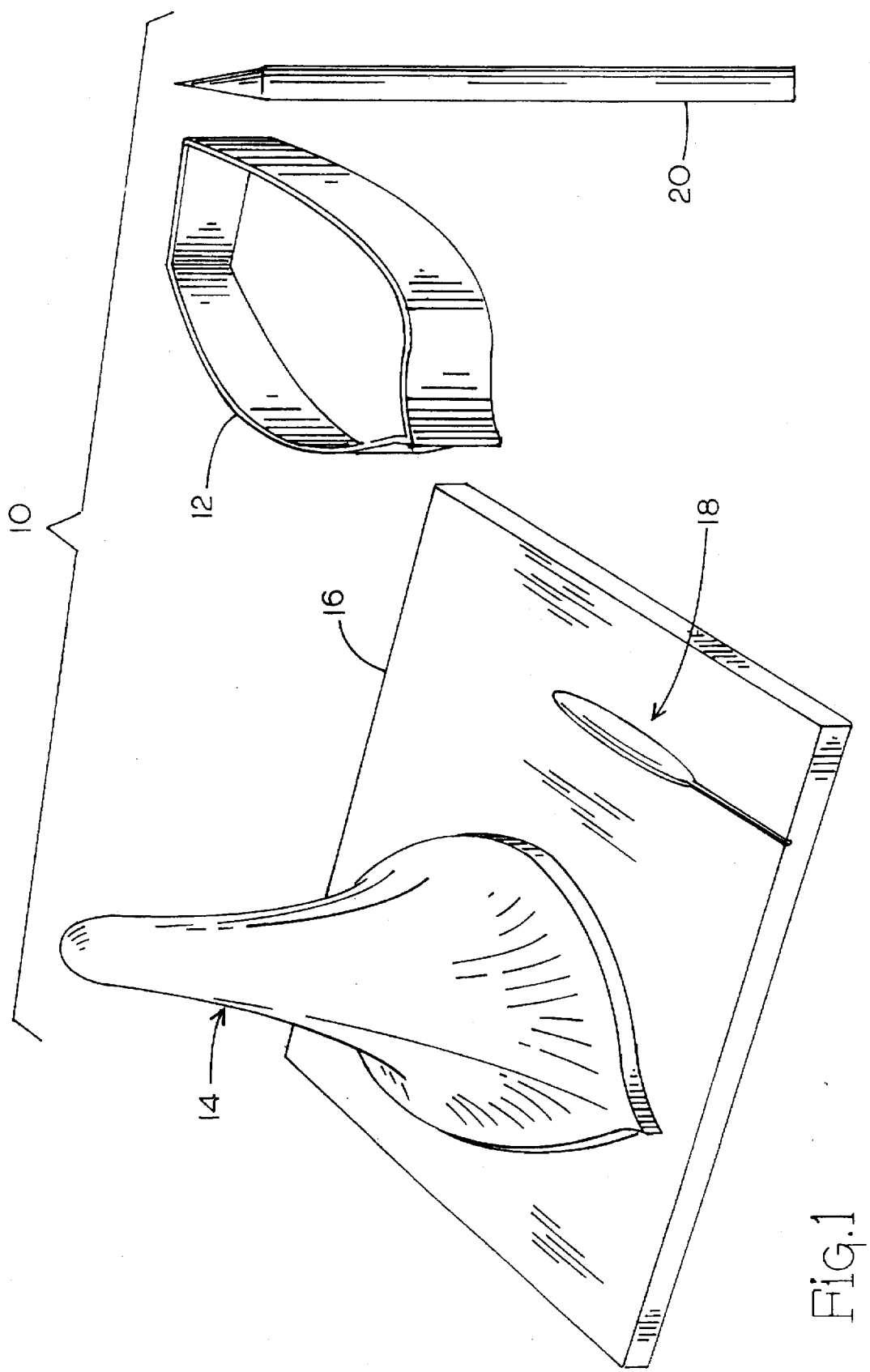
FIG. 1 depicts a kit for forming simulated flowers from a confectionery material according to the method of the present invention.

The present invention is described more fully hereinafter by referring to the drawings, in which a preferred embodiment is depicted. However, the present invention can take on many different embodiments and is not intended to be limited to the embodiments described herein.

Referring now to the drawings in general and FIG. 1 in particular, a kit 10 for forming artificial flowers 11 from thin sheets of a confectionery material is shown constructed according to the present invention. In the most basic embodiment, the kit 10 includes: one or more template cutters 12 and a male mold 14 for forming the artificial flowers. Optionally, the kit 10 may also include a flower holder 22 (See FIG. 5), and a ruffling tool 20.

Figure 2:
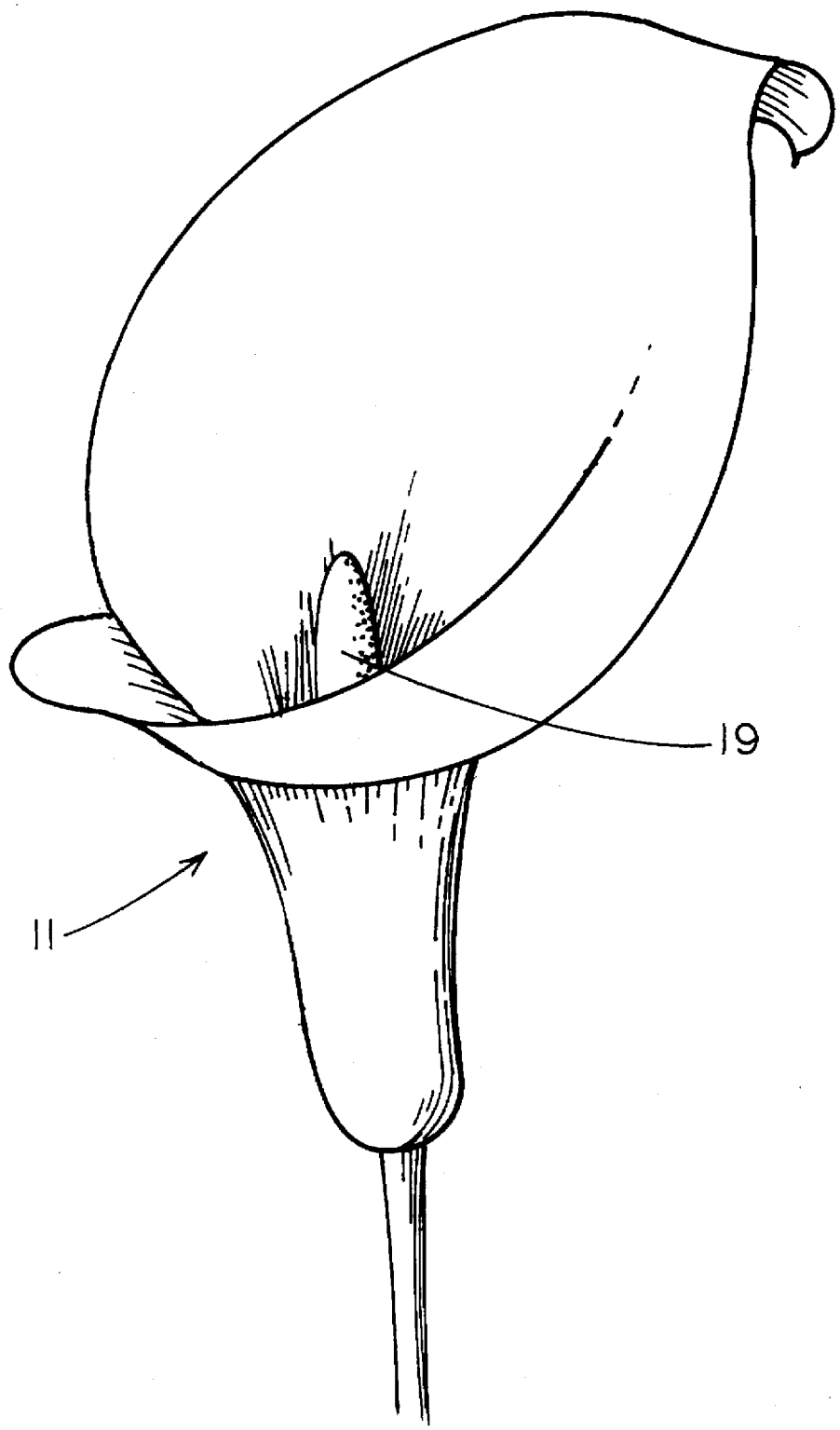
FIG. 2 depicts a representative simulated flower formed by using the kit and method of the present invention.

The artificial flowers 11 may be modeled after nearly any type of flower model such as a lily, an orchid, tulip, callalily, several species of orchids, morning glory, dogwood, gardenia, magnolia, anthurium, hibiscus, freesia, rubrium lily, pansy and iris. FIG. 2 shows a representative simulated flower 11 formed from thin sheets of confectionery material, which in this case resembles a calla lily. The confectionery material from which the flowers 11 are formed may be any type of preferably edible cake decorating substance such as gum paste, fondant, icing, chocolate, etc. To best carry out the method of the invention (described later) using the kit 10 of the invention, the confectionery material should be in moist, pliable, semi-solid form so that it can be easily rolled out into thin sheets and shaped to form the confectionery flowers 11. Such confectionery materials are well known to those in the cake decorating arts and will not be described herein in detail.

Turning now to the components of the kit 10 of the invention, each template cutter 12 is formed in the shape of a part of any chosen flower model. The template cutter 12 is used for cutting a thin sheet of the confectionery material into a blank corresponding to the shape of a particular flower part, such as a leaf or petal. Different shapes and sizes of template cutters 12 can be provided in the kit 10 to cut sheets into the shapes of various leaves and petals of the chosen flower model. For example, with a kit 10 used to form artificial orchids, three template cutters 12 are needed to form the three shapes of petals in an orchid in addition to as many different template cutters 12 as are needed to form the leaves. Alternately, with some type of flower models, only a single template cutter 12 may be needed to cut the appropriate shapes and sizes of gum paste blanks 13.

The template cutters 12 are all constructed by carefully measuring the peripheral boundaries of a flattened flower model part such as a leaf or petal then using the obtained measurements to form the cutters 12. The template cutters 12 may be formed from molded plastic, strips of curved metal, or any other material commonly used to cut dough and the like.

The male mold 14 is used to form the confectionery material blank or blanks 13 into a simulated flower 11. Preferably, the male mold 14 is supported by a flat base 16 and has an exterior surface that generally conforms to the interior surface of the flower model. Most preferably, the male mold 14 also includes a textured surface conforming to the texture of the flower model, such as veins, ridges, etc. to produce a more realistic flower made of the confectionery material.

The male mold 14 may be constructed in any of several ways. One way is to carefully coat the interior surface of the flower model with molten wax to make a wax form (not shown) that is removed from the flower model when hardened. The wax form is in turn used to form the male mold 14, which may be cast from any relatively rigid, durable material such as plastic. Preferably, the male mold 14 is cast from a somewhat slippery material that easily releases the confectionery material.

Figure 5:
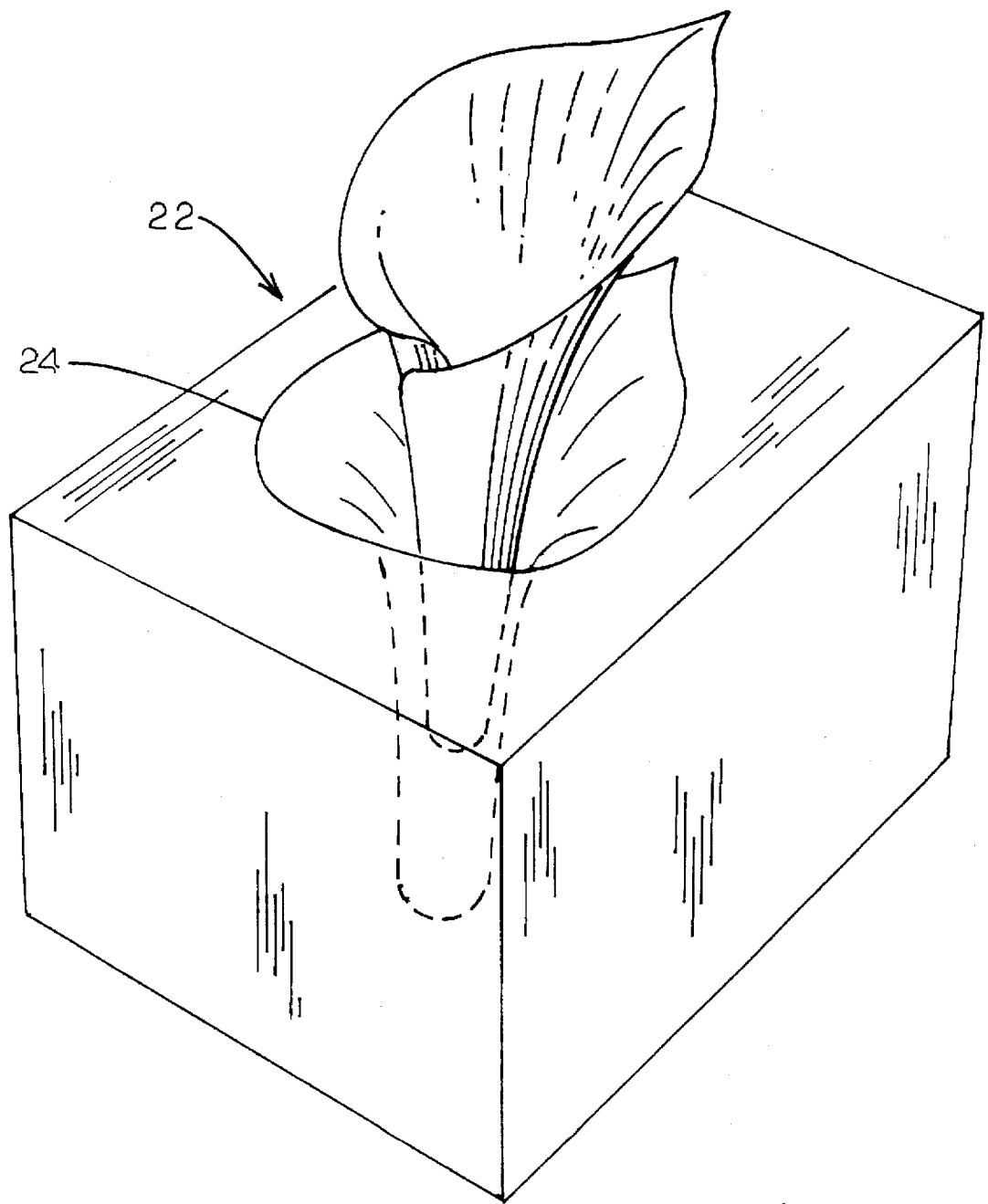

The flower holder 22 is used to support confectionery flowers 11 until the confectionery material hardens (See FIG. 5). Preferably, the flower holder 22 is designed to hold several flowers 11 at once. Although the flower holder 22 may take on several different embodiments, all embodiments include a surface that generally conforms to an exterior surface of the flower 11. As such, the preferred embodiment of the flower holder 22 includes one or more female molds 24 formed from the male mold 14. FIG. 5 depicts a flower holder 22 with a female mold 24 formed therein. In this embodiment, the interior of the female mold 24 corresponds to the exterior of the male mold 14 and thereby generally conforms to the exterior surface of the flower 11 formed on the male mold 14. Alternately, the female mold 24 may be molded from the exterior surface of the flower model instead of from the male mold 14. Using this embodiment, the exterior texture of an actual flower can be imparted to the exterior surface of the simulated flower 11 using the method of the present invention described below. The female mold 24 may be formed from any moldable material that retains its shape, such as plastic.

Alternatively, the flower holder 22 may include a volume of deformable granular material such as powdered sugar or the like. In this case, the surface of the powdered sugar would be shaped to generally conform to the exterior surface of the flower 11.

In addition to the above-described basic components, the kit 10 may also include a stamen mold 18 for forming an artificial stamen 19 from confectionery material. The stamen mold 18 preferably includes a concave molding surface conforming to an exterior surface of a stamen of the flower model. Thus, the stamen mold 18 imparts the texture, shape, and size of an actual stamen of the flower model to the confectionery material forming the artificial stamen 19. The stamen mold 18 may be constructed in much the same way as the male mold 14 by coating the stamen model with wax then casting the plastic mold 18. In the preferred embodiment, the stamen mold 18 is formed in the base 16 of the male mold 14.

Another optional component of the kit 10 is a ruffling tool 20, which is used to ruffle the peripheral edges of the blank or blanks of confectionery material used to form the flower 11. As shown, the ruffling tool 20 preferably comprises a pointed dowel or other elongated tool for rolling over the edges of the cut blanks of confectionery material to increase the surface area along the edges and simulate ruffled edges of the flower model.

Now turning to the inventive method of forming simulated flowers 11 from the confectionery material, the first step is to provide the components of the kit 10 described above. Thus, the male mold 14 is constructed such as by coating the interior surface of the flower model with molten wax to make a wax form, which is then used to cast the male mold 14. Although most flowers 11 will only require a single male mold 14, some flowers 11 with particularly intricate shapes may require two male molds 14. For simplicity, only a single male mold is shown. The template cutter or cutters 12 are made as described above, such as by measuring the peripheral boundaries of a leaf or petal then using these measurements to form the cutters 12. To carry out the method of the present invention, the kit 10 provides as many different cutters 12 as are needed to cut the varying shapes and sizes of leaves and petals. The flower holder 22 is also constructed as described above, preferably by forming one or more female molds 24 from the male mold 14.

Figure 3:
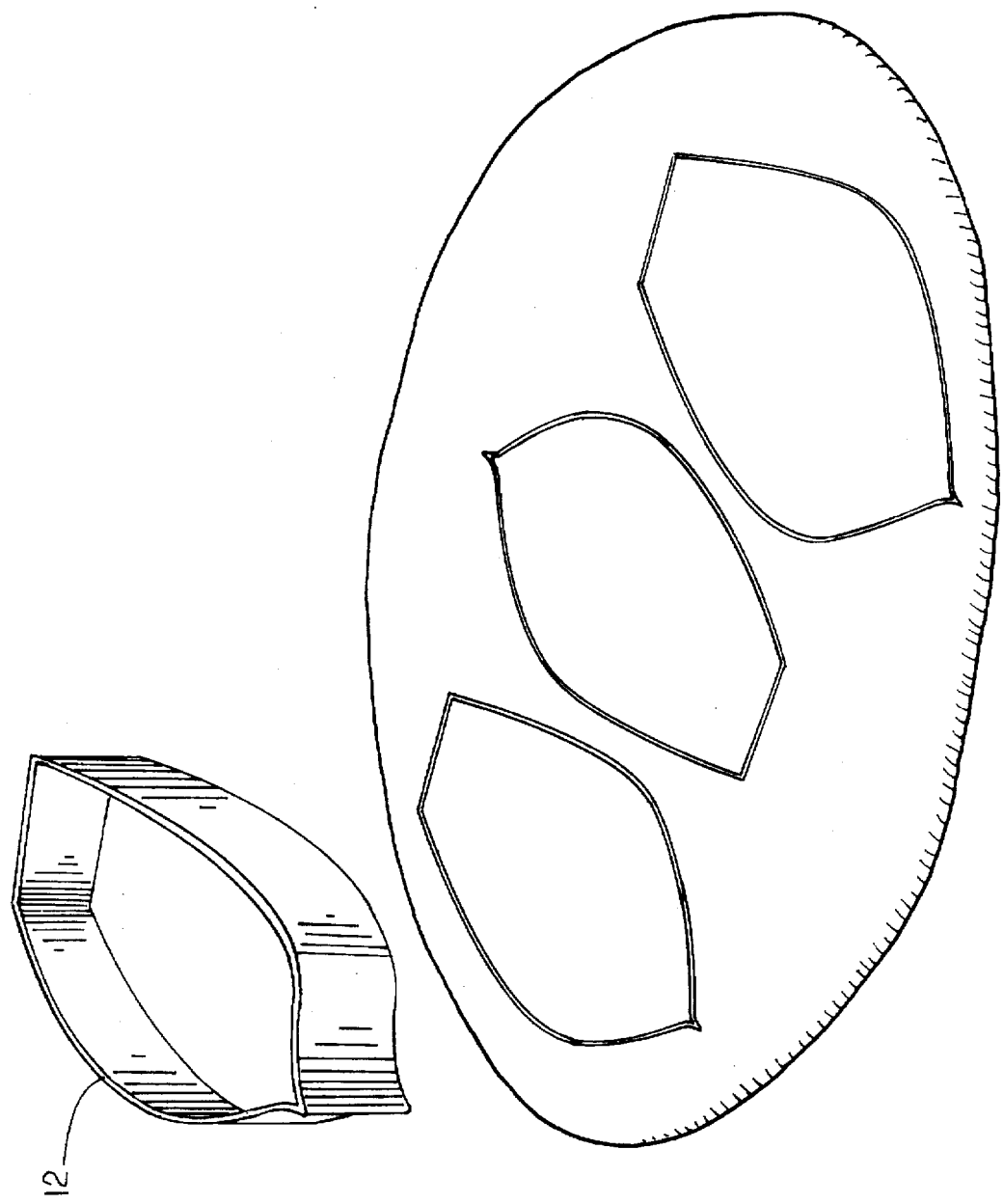
FIGS. 3–5 illustrate the method for making simulated flowers using the kit shown in FIG. 1.
Figure 4:
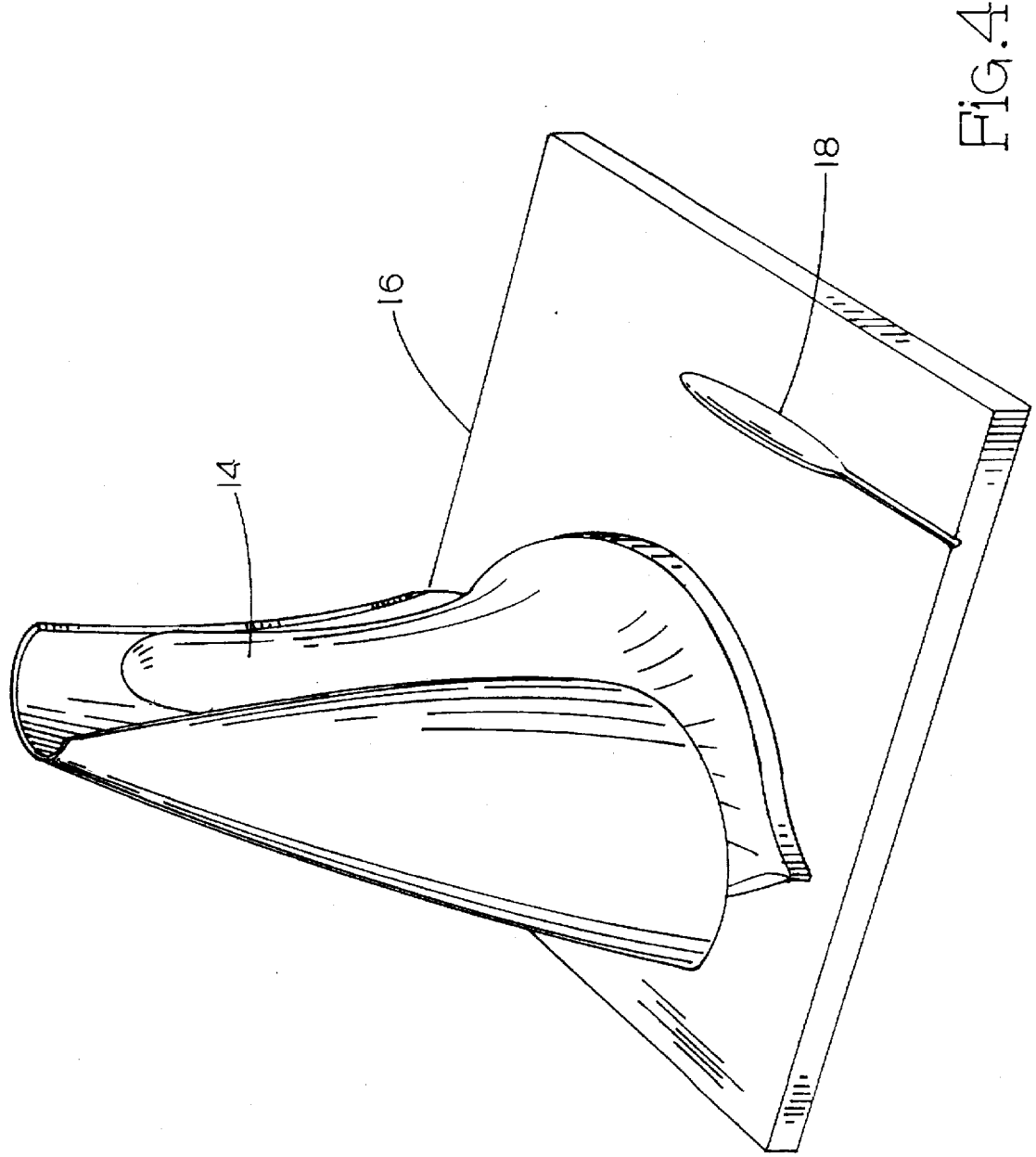

Referring now to FIGS. 3–5, the method of making flowers from confectionery material is illustrated. The first step is to roll out gum paste or other soft, pliable confectionery material into a thin sheet having approximately the same thickness as the petals or leaves of the flower model—preferably as thin as possible. The next step is to use the template cutter or cutters 12 to cut the sheet of confectionery material into blanks with shapes corresponding to parts of the flower model as shown in FIG. 3. Steps should be taken to prevent the cut blanks from drying and becoming brittle prior to being molded into the flowers 11.

At this point, the peripheral edges of the blanks of confectionery material may be ruffled if desired to simulate ruffled edges of the flower model, depending on the type of flower used as the model. To ruffle the edges, the blank is placed in the palm of the cake decorator's hand, which is preferably covered with powdered sugar to prevent sticking. The ruffling tool 20, which is preferably a pointed dowel, is then rolled over the edges of the blank until the edges have been sufficiently thinned. As the edges are thinned, the confectionery material is stretched, which thereby increases the surface area of the blank along the edges and leads to the edges taking on a wavering, ruffled shape.

The next step is to wrap the blank or blanks of confectionery material around the male mold 14, as shown in FIG. 4, and manually press the blanks onto the exterior surface thereof. Pressing the blanks against the mold imparts the surface texture of the flower model to the interior surface of the artificial confectionery flower 11. Preferably, the blanks are left on the male mold 14 for approximately thirty seconds. Depending on the type of simulated flower 11 being molded, one or more blanks are pressed onto the mold 14. The edges of adjacent blanks are overlapped and may be securely held together by spreading a thin layer of egg white or other edible adhesive substance in between the overlapping edges.

After the simulated flower 11 has been formed on the male mold 11, the next step is to remove the flower 11 from the male mold 14 and support the flower 11 in the flower holder 22 to maintain the flower's molded shape until the confectionery material hardens. Each simulated flower 11 is placed either in one of the female molds 24 so that the exterior surface of the flower 11 is supported while the interior surface is untouched. If a female mold 24 cast from an actual flower model is used, texture of the flower model's exterior will be impressed on the outer surface of the simulated flower 11. Preferably, the flower 11 is allowed to harden for approximately 24 to 48 hours so that it will not lose its shape when placed on a cake or the like. After the flowers 11 have hardened, they may be used in any desired manner to decorate cakes, cookies, pies, etc.

In molding some types of simulated flowers 11 it is desirable to provide a simulated stamen 19 in the interior of the flower 11. Therefore, the method of the present invention may also include the steps of disposing confectionery material around a wire or other thin elongated member and inserting the confectionery material into the stamen mold 18. As explained earlier, the stamen mold 18 preferably includes a concave molding surface conforming to an exterior surface of a stamen of the flower model, depending on the type of flower used as the model. The confectionery material on the wire is thereby molded into the shape of the stamen model to form the simulated stamen 19 with the exterior shape and texture of the actual stamen.

The next step is to insert the stamen 19 into the flower 11 so that the stamen is disposed in the interior of the flower while the wire 28 protrudes from the bottom of the flower 11. The stamen 19 is attached to the flower 11 by applying a dab of gum paste, egg white, or other edible adhesive to the bottom of the flower 11 from which the wire protrudes. The flower 11 is held in place on a cake or the like by inserting the wire into the cake.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of forming simulated flowers from a confectionery material, comprising the steps of:
    a) constructing a male mold having an exterior surface that generally conforms to an interior surface of a flower model;
    b) rolling a confectionery material into a thin sheet;
    c) cutting the sheet of confectionery material to form a blank corresponding to the shape of at least one part of the flower model; and
    d) forming the blank around the male mold and pressing the blank onto the exterior surface of the male mold, thereby creating a simulated flower formed from the confectionery material.

2. The method according to claim 1 further comprising the steps of removing the simulated flower from the male mold and supporting the simulated flower to maintain the flower's molded shape until the confectionery material hardens.

3. The method according to claim 2 wherein supporting the simulated flower includes supporting the flower in an indentation in a deformable granular material shaped to generally conform to an exterior surface of the flower.

4. The method according to claim 2 wherein supporting the simulated flower includes supporting the flower in a female mold generally conforming to an exterior surface of the flower.

5. The method according to claim 4 further including the step of forming the female mold from the male mold.

6. The method according to claim 1 wherein the step of cutting the sheet of confectionery material includes cutting the sheet with at least one template cutter formed in the shape of at least one part of the flower model.

7. The method according to claim 1 including the step of cutting the sheet of confectionery material a plurality of blanks, each blank having a shape corresponding to a different part of the flower model.

8. The method according to claim 1 further comprising the step of ruffling the peripheral edges of the blank to simulate ruffled edges of the flower model.

9. The method according to claim 8 wherein ruffling the edges of the blank includes thinning the edges thereof, thereby stretching the confectionery material and increasing the surface area of the blanks along the edges.

10. The method according to claim 9 wherein the edges of the blank are ruffled by rolling a pointed dowel over the edges.

11. The method according to claim 1 further comprising the steps of forming a simulated stamen for the simulated flower by disposing confectionery material around an elongated member and inserting the stamen into the interior of the flower.

12. The method according to claim 11 further comprising the step of inserting the stamen into a stamen mold having a concave molding surface conforming to an exterior surface of a stamen model thereby molding the confectionery material disposed around the elongated member into the shape of the stamen model.

13. A method of forming simulated flowers from a confectionery material comprising the steps of:

a) constructing a male mold having an exterior surface that generally conforms to an interior surface of a flower model;

b) constructing a female mold having an interior surface that generally conforms to an exterior surface of the flower model;

c) rolling a confectionery material into a thin sheet;

d) cutting the sheet of confectionery material with at least one template cutter to form a blank corresponding to the shape of at least one part of the flower model;

e) forming the blank around the male mold and pressing the blank onto the exterior surface of the male mold to create a simulated flower formed from the confectionery material; and f) removing the simulated flower from the male mold and supporting the simulated flower in the female or male mold to maintain the flower's molded shape until the confectionery material hardens.

14. The method according to claim 13 further comprising the step of ruffling the peripheral edges of the blank by thinning the edges thereof to thereby stretch the confectionery material and increasing the surface area of the blanks along the edges to simulate ruffled edges of the flower model.

15. The method according to claim 13 further comprising the steps of disposing confectionery material around an elongated member to form a simulated stamen, inserting the simulated stamen into a stamen mold having a concave molding surface conforming to an exterior surface of a stamen model, and inserting the molded stamen into the interior of the flower formed from the confectionery material.

* * * * *